United States Patent
Palmer (10) Patent No.: US 8,573,608 B2
(45) Date of Patent: Nov. 5, 2013

(54) MODULAR CLAMP ASSEMBLY WITH MULTIPLE TOOL ATTACHMENTS

(75) Inventor: John Palmer, Torrington, CT (US)

(73) Assignee: On The Level Billiards, LLC, Torrington, CT (US)

( * ) Notice: Subject to any disclaimer, the term of this patent is extended or adjusted under 35 U.S.C. 154(b) by 0 days.

(21) Appl. No.: 13/594,006

(22) Filed: Aug. 24, 2012

(65) Prior Publication Data

US 2012/0317758 A1 Dec. 20, 2012

Related U.S. Application Data

(63) Continuation of application No. 13/112,082, filed on May 20, 2011, now Pat. No. 8,312,598.

(60) Provisional application No. 61/354,993, filed on Jun. 15, 2010.

(51) Int. Cl.
*B62B 1/00* (2006.01)

(52) U.S. Cl.
USPC .............................. 280/47.18; 16/422; 16/426

(58) Field of Classification Search
USPC ......... 280/47.18; 16/405, 406, 409–410, 424, 16/426
See application file for complete search history.

(56) References Cited

U.S. PATENT DOCUMENTS

| | | | | |
|---|---|---|---|---|
| 2,156,195 A * | 4/1939 | Robillard | ..................... | 269/174 |
| 2,939,662 A | 6/1960 | Johnson | | |
| 4,437,654 A * | 3/1984 | Chiappetti | ..................... | 269/283 |
| 4,747,588 A * | 5/1988 | Dillhoff | ........................... | 269/6 |
| 4,747,590 A | 5/1988 | Yang | | |
| 4,903,929 A * | 2/1990 | Hoffman | .................. | 248/229.15 |
| 4,976,280 A * | 12/1990 | Lagana | .................... | 137/315.41 |
| 5,921,597 A | 7/1999 | Thiele | | |
| 6,067,693 A * | 5/2000 | Chen | ................ | 24/514 |
| 6,431,534 B1 * | 8/2002 | Orosz et al. | ..................... | 269/43 |
| 6,499,867 B1 * | 12/2002 | Neal | ............................ | 362/477 |
| 7,213,805 B2 * | 5/2007 | Nishimura et al. | ........... | 269/228 |
| 2005/0082729 A1 * | 4/2005 | Wong | ............................. | 269/91 |
| 2010/0026023 A1 | 2/2010 | Hernandez | | |

* cited by examiner

*Primary Examiner* — John Walters
*Assistant Examiner* — James Triggs
(74) *Attorney, Agent, or Firm* — Cantor Colburn LLP (57) ABSTRACT

A clamp assembly including: a clamp frame including a first portion including a first opening which accepts a fastener, and a second portion interposed between the first portion and a third portion, wherein the third portion includes a second opening and a third opening, each of which accepts a fastener, a threaded rod disposed through the first portion of the clamp frame; and a clamp pad on an inner end of the clamp rod.

25 Claims, 9 Drawing Sheets

MODULAR CLAMP ASSEMBLY WITH MULTIPLE TOOL ATTACHMENTS

CROSS REFERENCE TO RELATED APPLICATION

This application is a continuation of U.S. patent application Ser. No. 13/112,082, filed on May 20, 2011, which claims priority to U.S. Patent Application No. 61/354,993 filed on Jun. 15, 2010, the contents of which in their entirety are herein incorporated by reference.

BACKGROUND OF THE INVENTION (1) Field of the Invention

This disclosure relates to a modular clamp assembly with multiple tool attachments.

(2) Description of the Related Art

Moving sheet media, such as a pool table slate, or furniture, such as a pool table, can be awkward and difficult. One reason is that the sheet media or furniture, e.g., slate, is heavy. A single piece of slate for a pool table slate can weigh 400 pounds. Also the slate may have dimensions similar to a confined space, such as a doorway, through which the slate is desirably transported through, leaving little room for a person or equipment to carry the load. Compounding the problem, moving the sheet media through the confined space may involve re-orienting the sheet media to a particular direction in order to maneuver the sheet media through the confined space.

Further compounding the problem, it is often desirable to move the sheet media up or down stairs or through the confined space without alteration or damage to the premises, making use of forklifts, pallet movers, or rolling dollies impractical or inappropriate. Thus the weight and dimensions of the sheet media, e.g., slate, and the configuration of any confined space through which the sheet media are to be moved, often make it ergonomically impractical to hand-carry the sheet media, and the presence of stairs or narrow doorways may make it impractical to use a forklift, hand-truck, pallet-mover, or rolling dolly without undesirable modification or damage to the premises.

The same problem applies to the moving of other sheet goods, which can occur in the course of construction or renovation, for example. Sheetrock (e.g., wallboard) or plywood, for example, are heavy and can be difficult to transport up or down stairs or through doorways.

Thus there remains a need for an improved tool for the transport of heavy and awkward sheet media.

BRIEF SUMMARY OF THE INVENTION

Disclosed is a clamp assembly including: a clamp frame including a first portion including a first opening which accepts a fastener, and a second portion interposed between the first portion and a third portion, wherein the third portion includes a second opening and a third opening, each of which accepts a fastener, a threaded rod disposed through the first portion of the clamp frame; and a clamp pad on an inner end of the clamp rod.

Also disclosed is a handle clamp assembly including: the clamp assembly disclosed above; a handle on the clamp frame, the handle including a bracket on the second portion of the clamp frame, and a grip extending from the bracket; and a slate shoe on the third portion of the clamp frame.

Also disclosed is a wheel clamp assembly including: a clamp assembly including a clamp frame including a first portion including a first opening which accepts a fastener, and a second portion interposed between the first portion and a third portion, wherein the third portion includes a second opening and a third opening, each of which accepts a fastener, a threaded clamp rod disposed through the first portion of the clamp frame, and a clamp pad on an inner end of the clamp rod, a slate shoe on the third portion of the clamp frame, the slate shoe including a surface which is opposite to a surface of the clamp pad a wheel mount on the second portion of the clamp frame, the wheel mount having a first end and a second end, and a wheel on each of the first end and the second end of the wheel mount.

Also disclosed is the wheel clamp assembly disclosed above, further including a vertical member having a first end and a second end, the first end interposed between the clamp pad and the surface of the slate shoe, and a banner, the banner extending from the vertical member.

Also disclosed is a tool tree including: a vertical member having a first end and an opposite second end; a handle clamp assembly on a first end of the vertical member, the handle clamp assembly including a first clamp assembly, the first clamp including a first clamp frame including a first portion of the first clamp frame including a first opening which accepts a fastener, a second portion of the first clamp frame interposed between the first portion and a third portion, wherein the third portion of the first clamp frame includes a second opening and a third opening, each of which accepts a fastener, a first threaded clamp rod disposed through the first leg of the first clamp frame, and a first clamp pad on an inner end of the first threaded clamp rod, a handle on the first clamp frame, the handle including a first bracket on the second portion of the first clamp frame, and a handle extending from the first bracket, and a slate shoe on the third portion of the first clamp frame and on the vertical member; a shelf support on the vertical member; a tool tree mount including a first end and an opposite second end, wherein the first end includes a surface on the vertical member, and the second end includes a foot; and a wheel clamp assembly on the second end of the vertical member, the wheel clamp assembly including a second clamp assembly, the second clamp assembly including a second clamp frame including a first portion of the second clamp frame including a first opening which accepts a fastener, a second portion of the second clamp frame interposed between the first portion and a third portion of the second clamp frame, wherein the third portion of the second clamp frame includes a second opening and a third opening, each of which accepts a fastener, a second threaded clamp rod disposed through the first portion of the second clamp frame, and a second clamp pad on an inner end of the second clamp rod, a wheel mount on the second portion of the second clamp frame, the wheel mount having a first end and a second end, and a wheel on each of the first end and the second end of the wheel mount.

Also disclosed is a hand truck including: a frame including a first side member and a second side member; a top handle mount interposed between the first side member and the second side member; a handle on a crossbar member of the top handle mount, the handle including a bracket on the crossbar of the top handle mount, and a grip extending from the bracket; a first shelf mount on a front side of the first side member; a second shelf mount on a front side of the second side member; a hand truck lip on the front side of the first side member and the front side of the second side member; and a wheel assembly on a middle member of the frame, the wheel assembly including a clamp assembly on the middle member, the clamp assembly including a clamp frame including a first portion including a first opening which accepts a fastener, and a second portion interposed between the first portion and a third portion, wherein the third portion includes a second opening and a third opening, each of which accepts a fastener, a threaded clamp rod disposed through the first portion of the clamp frame, and a clamp pad on an inner end of the clamp rod, a wheel mount on the second portion of the clamp frame, the wheel mount having a first end and a second end, and a wheel on each of the first end and the second end of the wheel mount.

BRIEF DESCRIPTION OF THE DRAWINGS

The above and other aspects, advantages and features of this disclosure will become more apparent by describing in further detail exemplary embodiments thereof with reference to the accompanying drawings, in which.

The detailed description explains the preferred embodiments of the invention, together with advantages and features, by way of example with reference to the drawings.

DETAILED DESCRIPTION OF THE INVENTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, portion, component, region, layer, or section from another element, portion, component, region, layer or section. Thus, "a first element," "component," "region," "portion," "layer," or "section" discussed below could be termed a second element, component, region, portion, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Disclosed is a modular clamp assembly that provides for the ergonomic and safe transport of an article. The modular clamp assembly can be reconfigured to accommodate the shape and size of the article, and to provide for the reorientation of the article to facilitate its transport through a confined space such as a doorway, for example, or over uneven ground, such as a stairway, for example.

The modular clamp assembly provides a secure method of holding the article. In addition, the clamp can be reversibly attached to wheels or a handle in various configurations. The handle and wheels can be attached to the clamp at a variety of positions, allowing for the balancing of the load, for example. Also, disclosed are handles of various configurations to provide for ergonomic moving of the article in various configurations, such as up or down stairs for example.

An additional feature, aspect, and advantage of the modular clamp assembly is that it can be reconfigured, reducing the quantity of tools that are transported to a job-site, facilitating the accommodation of unexpected challenges to the project, and reducing the cost of tooling.

Figure 1:
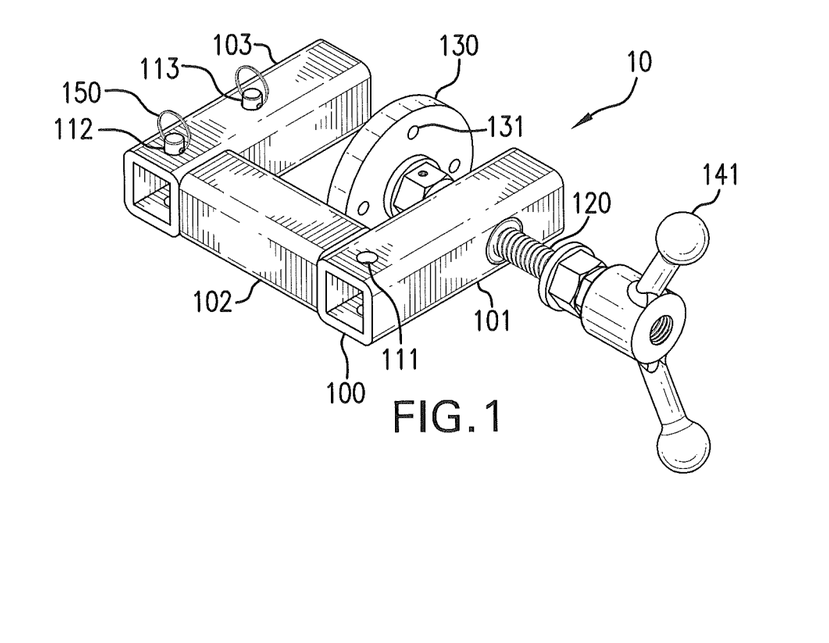
FIG. 1 is a schematic diagram of an embodiment of a clamp assembly.

Disclosed in FIG. 1 is a clamp assembly 10. The clamp assembly 10 comprises a clamp frame 100. The clamp frame 100 includes a first portion 101 including a first opening 111 which accepts a fastener, and a second portion 102 interposed between the first portion 101 and a third portion 103. The third portion 103 includes a second opening 112 and a third opening 113. Each of the second opening 112 and the third opening 113 are configured to accept the fastener. The clamp assembly 10 further comprises a threaded rod 120 disposed through the first portion of the clamp frame. On an inner end of the threaded rod is a clamp pad 130, and on an outer end of the threaded rod may be a nut, or handle, such as a T-spinner handle 141, if desired.

The clamp frame may comprise metal tubing or bar, and the metal tubing or bar may comprise a metal, such as iron, steel, aluminum, or titanium, or a polymer, such as polycarbonate, polyethylene, or polyvinyl chloride. In an embodiment the clamp frame comprises square steel tubing having a wall thickness of 0.1 to 1 inch, specifically ¼ inch, and in an embodiment each of the first portion, second portion, and third portion has the dimensions 0.1 to 5 inches by 0.1 to 5 inches by 1 to 12 inches, specifically the dimensions 1.5 inch by 1.5 inch by 6.75 inches, but is not limited thereto.

The first, second, and third openings 111, 112, and 113, respectively, may have a diameter of 0.1 to 1 inch, specifically 0.2 to 0.8 inch, more specifically about 0.25 inch. In an embodiment the first, second, and third openings 111, 112, and 113, respectively, have a same diameter and are configured to accept a fastener, such as a bolt or quick-release pin 150, for example.

The clamp pad may have any shape. In an embodiment the clamp pad has a circular shape. Also, the clamp pad 130 may further comprise a safety hole 131 extending through the clamp pad 130. The safety hole 131 may be used to fasten the clamp assembly 10 to the article to be moved using a screw, for example. In an embodiment, the clamp pad 130 has four safety holes.

A slate shoe 160 may be disposed on the third portion 103 of the clamp frame 100. The slate shoe 160 comprises a tab 161 having a hole that corresponds to the third opening 113. In an embodiment, the slate shoe 160 is mounted on the clamp frame 100 by a fastener disposed through the hole of the tab 161 and the third opening 113. In an embodiment the tab 161 is U-shaped and contacts the third portion 103 on three surfaces. The fastener may be quick-release pin, for example. The slate shoe further comprises a first panel 162 and a second panel 163, which is perpendicular to the first panel 162. A surface of the first panel 162 is opposite and parallel to a surface of the clamp pad 130.

Figure 2:
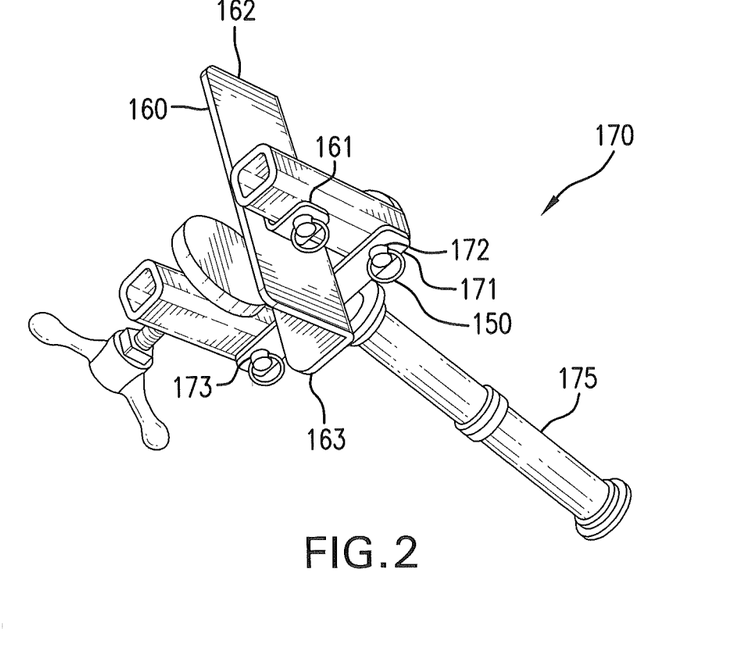
FIG. 2 is a schematic diagram of an embodiment of a single handle clamp assembly.
Figure 3:
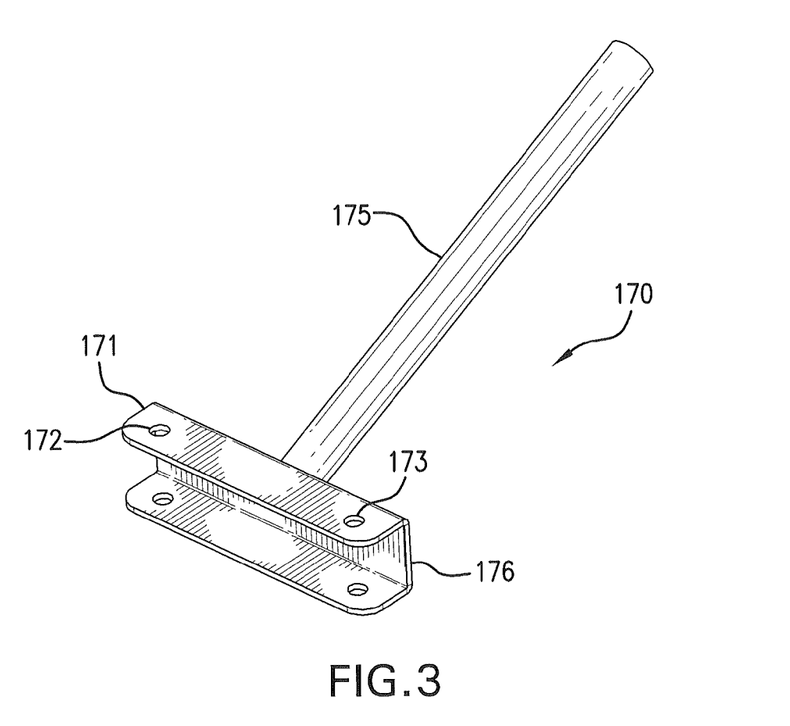
FIG. 3 is a schematic diagram of an embodiment of a single handle.
Figure 4:
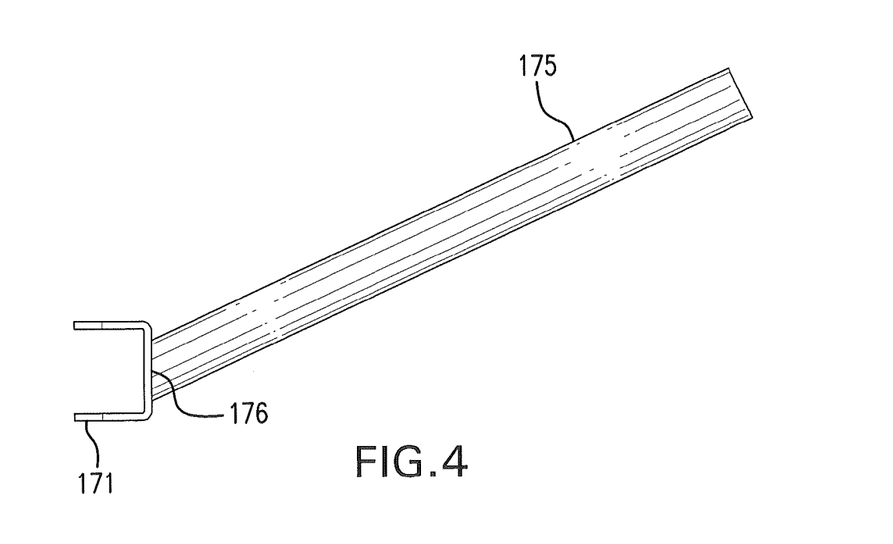
FIG. 4 side view of an embodiment of the single handle.

A single handle 170 may be disposed on the second portion 102 of the clamp frame 100 as shown in FIG. 2 to provide a handle clamp assembly. The single handle may comprise a bracket 171 and a single handle grip 175. The bracket 171 of the single handle 170 may comprise first and second holes 172 and 173, respectively, which correspond to the first opening 111 and the second opening 112 of the second portion 102. In an embodiment the bracket 171 of the single handle 170 is removably mounted on the clamp frame 100 by a fastener, such as a quick-release pin 150. The fastener may be quick-release pin, for example. Another embodiment of the single handle 170 is shown in FIG. 3. The bracket 171 and the single handle grip 175 may each independently comprise a metal, such as iron, steel, aluminum, or titanium, or a polymer, such as polycarbonate, polyethylene, or polyvinyl chloride, and may further comprise a rubber, such as vinyl or butyl rubber, for example. In an embodiment the single handle grip has a length of 2 to 20 inches, specifically 12 inches, and a diameter of 0.1 to 2 inches, specifically 1 inch. Also, the single handle grip may extend in a direction perpendicular to a front surface 176 of the bracket 171, or may be inclined relative to the front surface of the bracket 171. In an embodiment, the single handle grip 175 is inclined at an angle of 1 to 45°, specifically 25° above a direction perpendicular to the front surface 176 of the bracket 171 as shown in FIG. 4.

Figure 5:
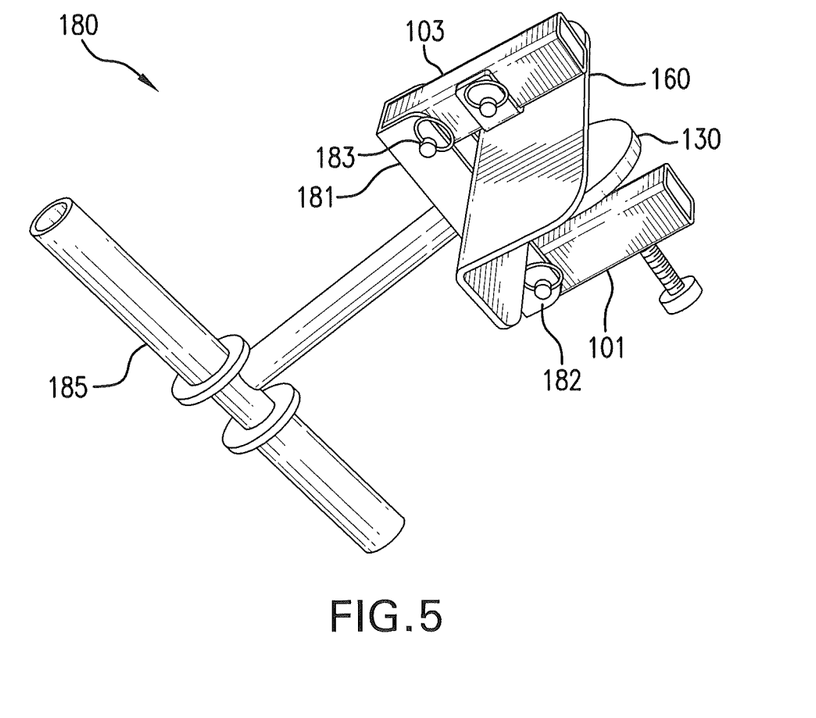
FIG. 5 is a schematic diagram of an embodiment of a T-handle clamp assembly.
Figure 6:
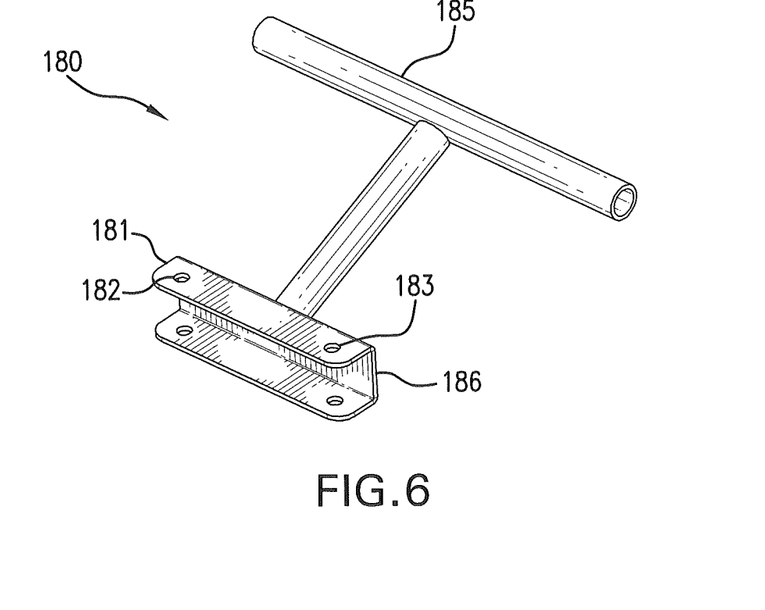
FIG. 6 is a schematic diagram of an embodiment of a T-handle.

A T-handle 180 may be disposed on the second portion 102 of the clamp frame 100 as shown in FIG. 5 to provide another embodiment of the handle clamp assembly. The T-handle may comprise a bracket 181 of the T-handle 180 and a T-handle grip 185. The bracket 181 of the T-handle 180 may comprise first and second holes 182 and 183, respectively, which correspond to the first opening 111 and the second opening 112 of the second portion 102. In an embodiment the bracket 181 of the T-handle 180 is removably mounted on the clamp frame 100 by a fastener, such as quick-release pin 150. The fastener may be quick-release pin, for example. Another embodiment of the T-handle is illustrated in FIG. 6. The bracket 181 and the T-handle grip 185 may each independently comprise a metal, such as iron, steel, aluminum, or titanium, or a polymer, such as polycarbonate, polyethylene, or polyvinyl chloride, and may further comprise a rubber, such as vinyl or butyl rubber, for example. In an embodiment the T-handle has a length of 2 to 14 inches, specifically 7 inches, a width of 6 to 24 inches, specifically 12.5 inches, and a diameter of 0.1 to 4 inches, specifically 1 inch. Also, the T-handle grip may extend in a direction perpendicular to a front surface 186 of the bracket 181, or may be inclined relative to the front surface of the bracket 181. In an embodiment, the T-handle grip 185 is inclined at an angle of 1 to 45°, specifically 25° above a direction perpendicular to the front surface 186 of the bracket 181.

Figure 7:
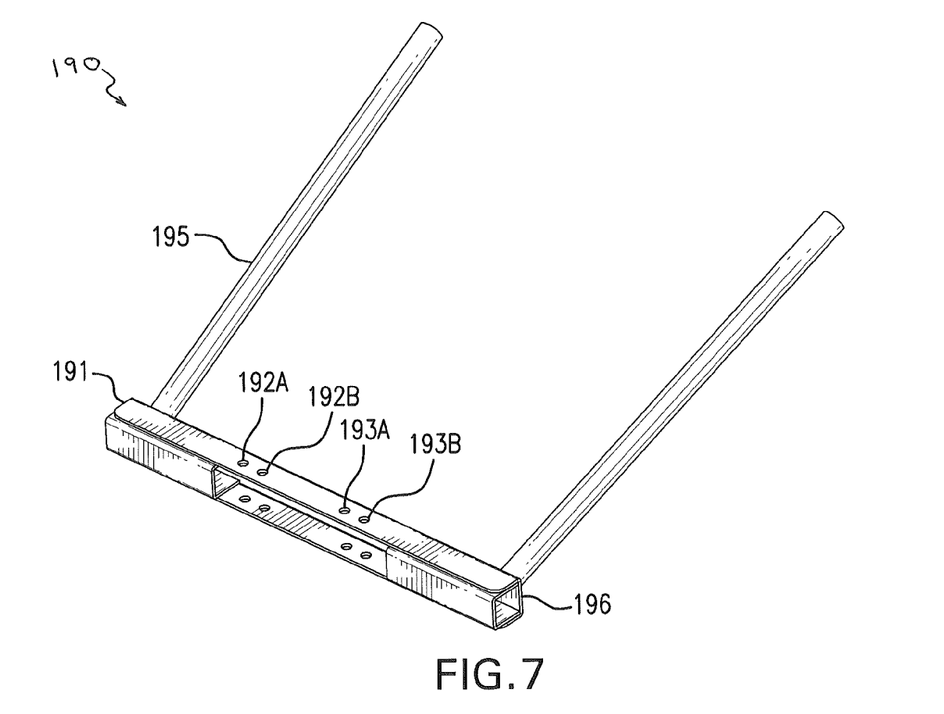
FIG. 7 is a schematic diagram of an embodiment of a double handle.

A double handle 190, shown in FIG. 7, may also be removably disposed on the second portion 102 of the clamp frame 100 to provide another embodiment of the handle clamp assembly. The double handle 190 may comprise a bracket 191 of the double handle 190 and a double handle grip 195. The bracket 191 of the double handle 190 may comprise a first set of first and second holes 192A and 193A, respectively, which correspond to the first opening 111 and the second opening 112 of the second portion 102, respectively, and a second set of first and second holes 192B and 193B, respectively, which correspond to the first opening 111 and the second opening 112 of the second portion 102, respectively. In an embodiment the bracket 191 of the double handle 190 is removably mounted on the second portion 102 of the clamp frame 100 by a fastener. The fastener may be quick-release pin, for example. The bracket 191 and the double handle grip 195 may each independently comprise a metal, such as iron, steel, aluminum, or titanium, or a polymer, such as polycarbonate, polyethylene, or polyvinyl chloride, and may further comprise a rubber, such as vinyl or butyl rubber, for example. In an embodiment the double handle has a length of 2 to 40 inches, specifically 20 inches, a width of 10 to 40 inches, specifically 18 inches, and each grip has a diameter of 0.1 to 4 inches, specifically 1 inch. Also, the double handle grip may extend in a direction perpendicular to a front surface 196 of the bracket 191, or may be inclined relative to the front surface of the bracket 191. In an embodiment, the double handle grip 195 is inclined at an angle of 1 to 45°, specifically 25° above a direction perpendicular to the front surface 196 of the bracket 191.

Figure 8:
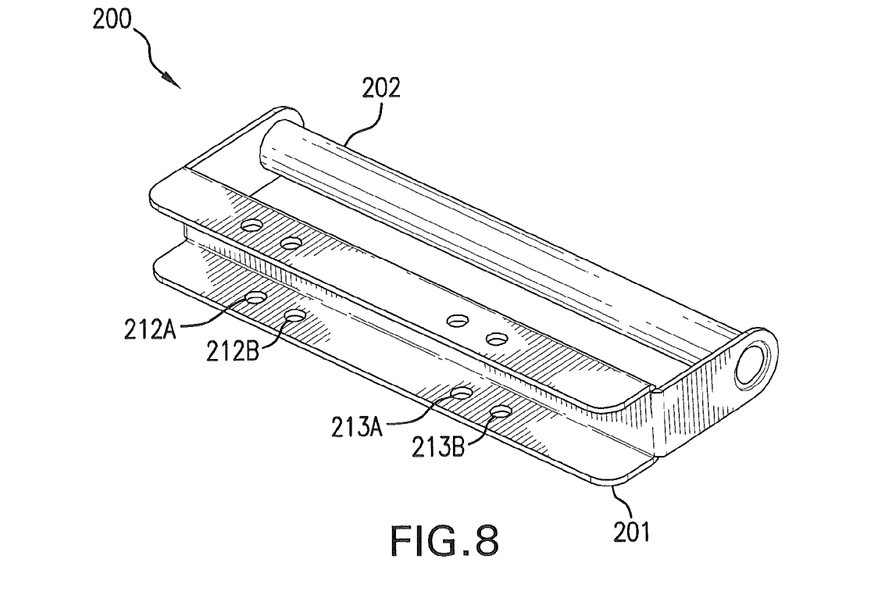
FIG. 8 is a schematic diagram of an embodiment of a cart handle.

A cart handle 200, shown in FIG. 8, may also be removably disposed on the second portion 102 of the clamp frame 100 to provide another embodiment of the handle clamp assembly. The cart handle 200 may comprise a bracket 201 of the cart handle 200 and a cart handle grip 202. The bracket 201 of the cart handle 200 may comprise a first set of first and second holes 212A and 213A, respectively, which correspond to the first opening 111 and the second opening 112 of the second portion 102, respectively, and a second set of first and second holes 212B and 213B, respectively, which correspond to the first opening 111 and the second opening 112 of the second portion 102, respectively. In an embodiment the bracket 201 of the cart handle 200 is removably mounted on the second portion 102 of the clamp frame 100 by a fastener. The fastener may be quick-release pin, for example. The bracket 201 and the cart handle grip 202 may each independently comprise a metal, such as iron, steel, aluminum, or titanium, or a polymer, such as polycarbonate, polyethylene, or polyvinyl chloride, and may further comprise a rubber, such as vinyl or butyl rubber, for example. In an embodiment the cart handle has a length of 2 to 20 inches, specifically 12 inches, a width of 2 to 10 inches, specifically 3.5 inches, and the cart handle grip has a diameter of 0.1 to 4 inches, specifically 1 inch.

Figure 9:
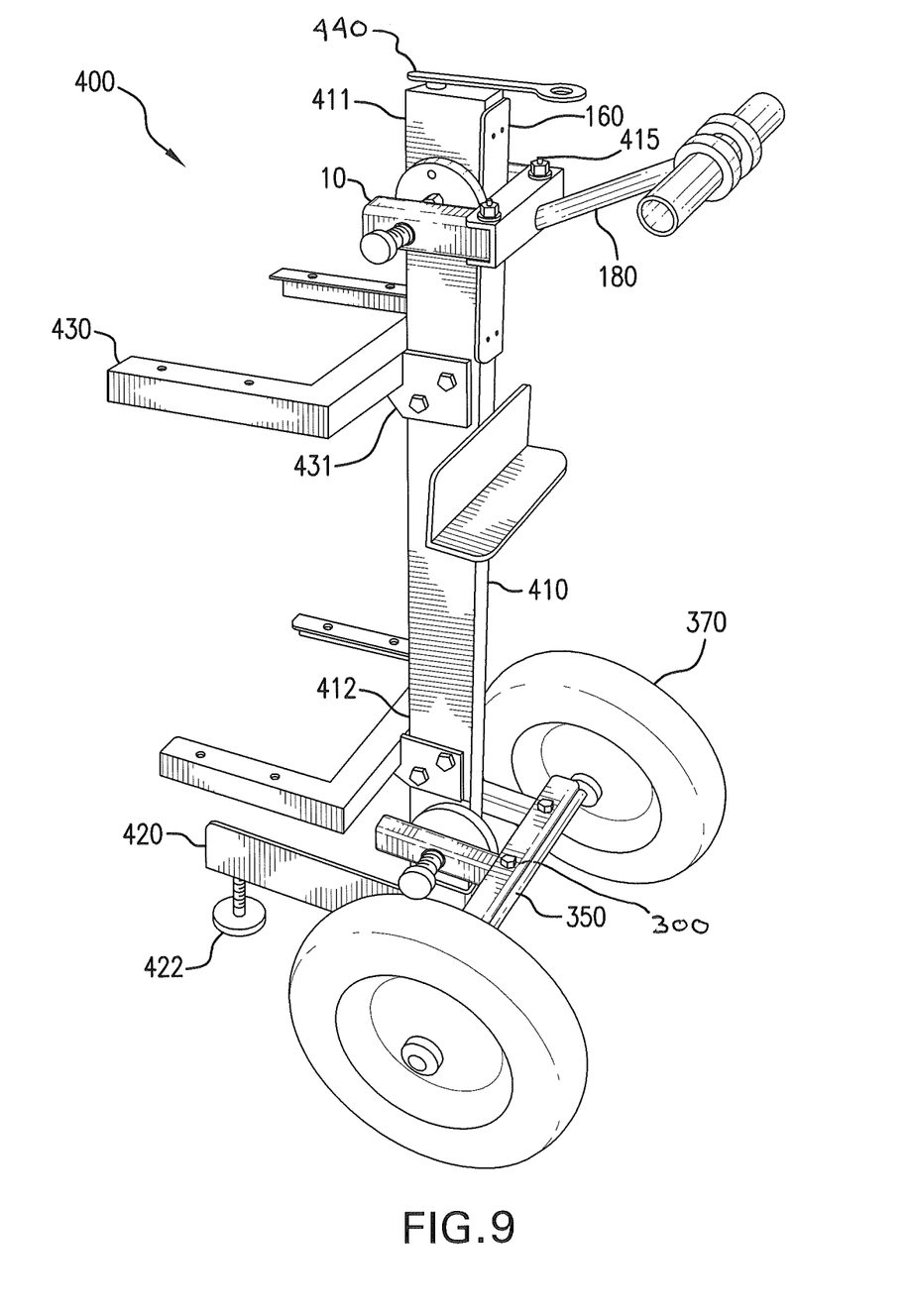
FIG. 9 is a schematic diagram of an embodiment of a tool tree.
Figure 10:
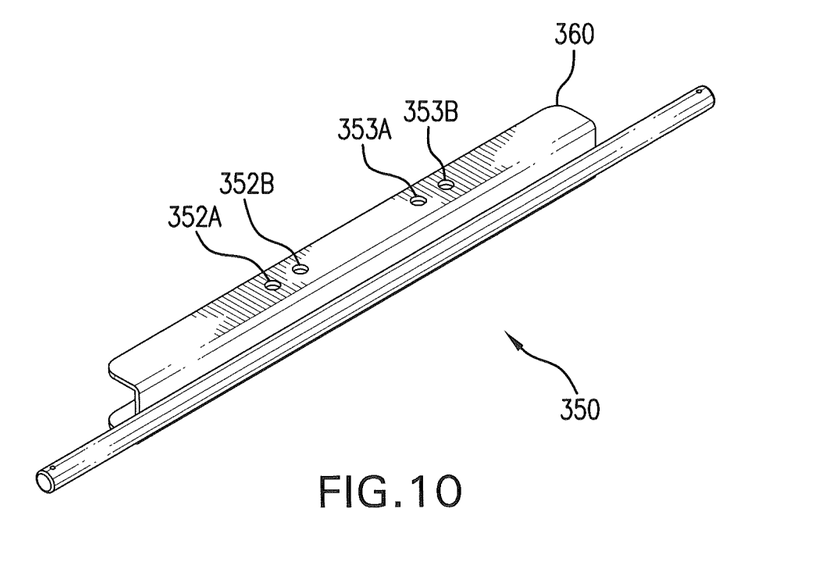
FIG. 10 is a schematic diagram of an embodiment of a wheel mount.

Also disclosed is a wheel clamp assembly 300, which is shown in FIG. 9 on a tool tree 400. The wheel clamp assembly 300 comprises a clamp assembly 10 having a wheel mount 350 removably disposed on the second portion 102 of the clamp frame 100 of the clamp assembly 10. The wheel mount 350 is also shown in FIG. 10. A bracket 360 of the wheel mount 350 may comprise a first set of first and second holes 352A and 353A, respectively, which correspond to the first opening 111 and the second opening 112 of the second portion 102, respectively, and a second set of first and second holes 352B and 353B, respectively, which correspond to the first opening 111 and the second opening 112 of the second portion 102, respectively. The bracket 360 of the wheel mount 350 may be removably mounted on the second portion 102 of the clamp frame with a fastener, such as a quick-release pin 150 or a bolt, for example. A wheel 370 may be disposed on either end of the wheel mount 350. The wheel mount 350 may comprise a metal, such as iron, steel, aluminum, or titanium, or a polymer, such as polycarbonate, polyethylene, or polyvinyl chloride, and may further comprise a rubber, such as vinyl or butyl rubber, for example. The wheel mount 350 may have major dimension (e.g., a length) of 20 to 40 inches, specifically 24 inches, and the bracket 360 of the wheel mount may have a major dimension (e.g., a length) of 10 to 30 inches, specifically 16 inches. In an embodiment, the bracket 360 may comprise a width of 0.5 to 4 inches, specifically 1.8 inches, and a height of 0.5 to 3 inches, specifically 1.4 inches. A diameter of an axle of the wheel mount may be 0.2 to 2 inches, specifically ⅝ inch.

Figure 11:
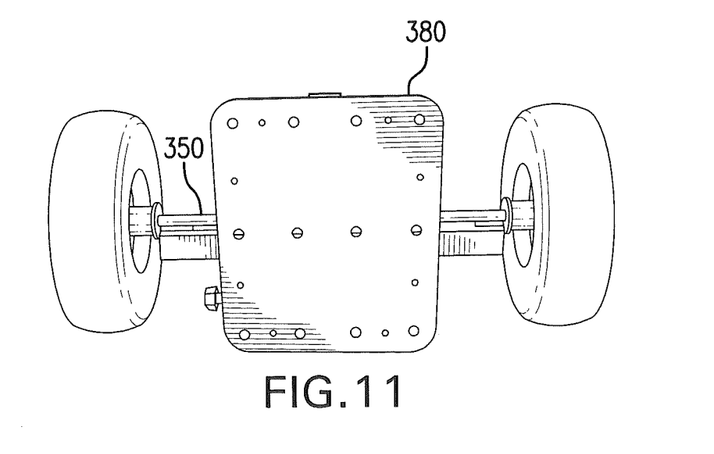
FIG. 11 is a schematic diagram of an embodiment of a universal lower mount.
Figure 12:
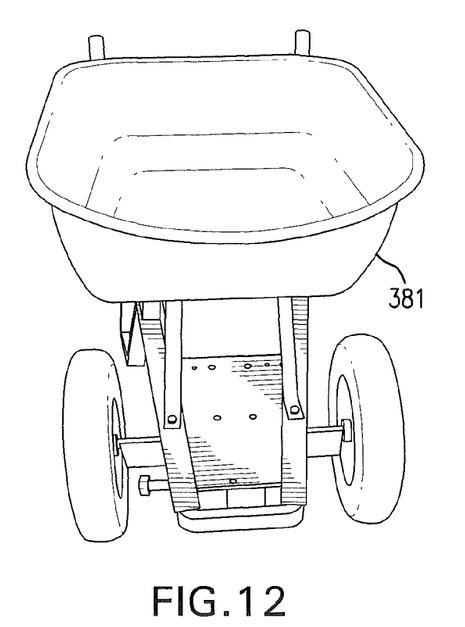
FIG. 12 is as schematic diagram of an embodiment of a wheelbarrow.

A universal lower mount 380, as shown in FIG. 11, may be removably disposed on the wheel mount 350. The universal lower mount 380 comprises a plate having a plurality of openings. A variety of devices may be conveniently mounted on the universal lower mount 380. For example, a wheelbarrow pan 381 may be mounted on the universal lower mount 380 to provide a wheelbarrow, as show in FIG. 12. The universal lower mount 380 may comprise a metal, such as iron, steel, aluminum, or titanium, or a polymer, such as polycarbonate, polyethylene, or polyvinyl chloride, and may further comprise a rubber, such as vinyl or butyl rubber, for example. In an embodiment, the universal lower mount 380 comprises steel.

Figure 13:
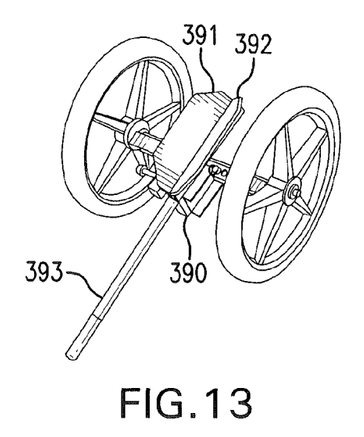
FIG. 13 is a schematic diagram of an embodiment of a V-saddle mount on wheel clamp assembly.

Alternatively, a V-saddle mount 390 may be removably mounted on wheel mount 350 of a wheel clamp assembly, as shown in FIG. 13. The V-saddle mount includes a first portion 391 and a perpendicular second portion 392, wherein an intersection of the first portion and the second portion is perpendicular to an axis of the wheel mount. In addition, the V-saddle mount may optionally include a handle 393 extending from the V-saddle mount in a direction parallel to a direction of the intersection.

Figure 14:
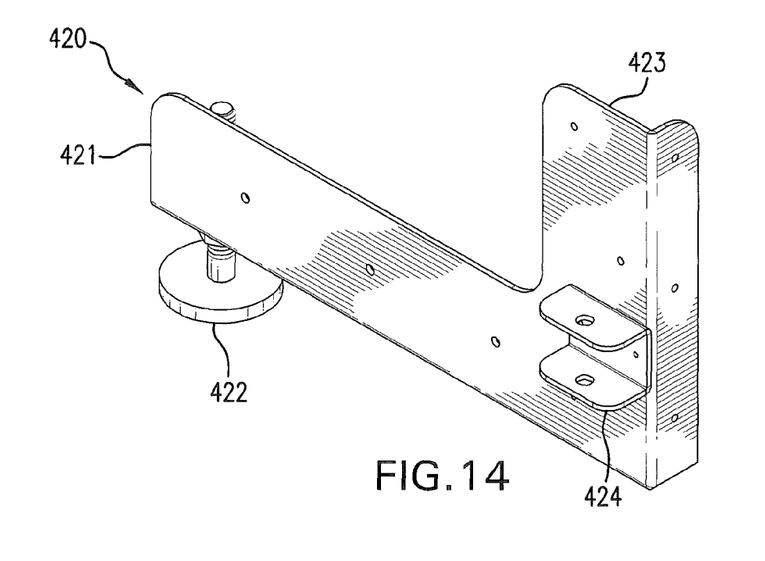
FIG. 14 is a schematic diagram of an embodiment of a tool tree mount.

Also disclosed is the tool tree 400, also shown in FIG. 9. The tool tree 400 comprises a vertical member 410 having an upper end 411 and an opposite lower end 412. On the opposite lower end of the vertical member 410 is a tool tree mount 420. The tool tree mount 420 is also shown in FIG. 14. The tool tree mount comprises a forward end 421 having a foot 422 disposed thereon, and a rear end 423. On a surface of the rear end 423 is a coupling bracket 424, which couples to the third portion 103 of the clamp assembly 10. The vertical member 410 may comprise a metal, such as iron, steel, aluminum, or titanium, or a polymer, such as polycarbonate, polyethylene, or polyvinyl chloride, and may further comprise a rubber, such as vinyl or butyl rubber, for example. In an embodiment, the vertical member 410 is a wooden 2×4 or 2×6, for example. The tool tree mount 420 may have length in a direction from the forward end 421 to the rear end 423 of 10 to 30 inches, specifically 16 inches, and a height taken perpendicular to the length of 5 to 20 inches, specifically 10 inches.

Adjacent to the tool tree mount 420 and on the vertical member 410 is a clamp assembly 10 of the wheel clamp assembly 300. Specifically, the vertical member 410 may be clamped between the clamp pad 130 and the third portion 103 of clamp assembly 10. In an embodiment, the clamp assembly 10 further comprises a slate shoe 160 disposed on the third portion 103 of the clamp frame, and the vertical member 410 is clamped between the clamp pad 130 of the clamp assembly 10 and a surface of the slate shoe 160. As is further disclosed above, the clamp assembly 10 of the wheel clamp assembly 300 may further comprise a wheel mount 350 disposed on a second portion 102 of the clamp frame 100, and a wheel 370 on each end of the wheel mount 350.

The tool tree 400 may further comprise a handle clamp assembly on the upper end 411 of the vertical member 410. The handle clamp assembly may comprise a clamp assembly 10 and the single handle 170, the T-handle 180, the double handle 190, or the cart handle 200. A slate shoe 160 may be optionally disposed on a third portion 103 of the clamp assembly 10 so that the vertical member 410 is interposed between the clamp pad 130 of the clamp assembly and a surface the slate shoe 160. A handle, e.g., the single handle 170, the T-handle 180, the double handle 190, or the cart handle 200, may be mounted on the second portion 102 of the clamp assembly 10 of the handle clamp assembly. The handle may be removably mounted on the clamp assembly by a fastener disposed through openings of the second portion 102 and corresponding holes of the bracket of the handle. The fastener may be a bolt 415, as shown in FIG. 9, or quick-release pin, for example.

The tool tree 400 may further comprise a shelf support 430 mounted on the vertical member 410. The shelf support 430 may comprise a bracket 431 configured to engage the vertical member 410 and an arm extending in a direction away from the vertical member 410. In an embodiment a plurality of shelf supports are disposed on the vertical member on a middle portion of the vertical member 410 which is between the upper end 411 and the lower end 412. In an embodiment, the shelf support 430 is disposed between the handle clamp assembly and the wheel clamp assembly. In an embodiment the shelf support 430 may support a toolbox, or a cooler, for example.

The tool tree 400 may further comprise a wrench 440. The wrench may be disposed on the upper end 411 of the vertical member 410, and may be mounted to the vertical member 410 by a bracket, for example. The wrench may be configured to interface with the threaded rod 120 of the clamp assembly 10, specifically the nut of the threaded rod 120. In an embodiment the wrench may have a length selected to substantially or effectively prevent over-torquing of the clamp assembly 10. Thus the length of the wrench 440 may be selected based on the characteristics of the clamp assembly 10, including the threaded rod 120, to substantially or effectively prevent over-torquing of the clamp assembly 10. In an embodiment the wrench may have a length of 1 to 20 inches, specifically 2 to 12 inches. A wrench having a length of 6 inches is specifically mentioned.

Figure 15:
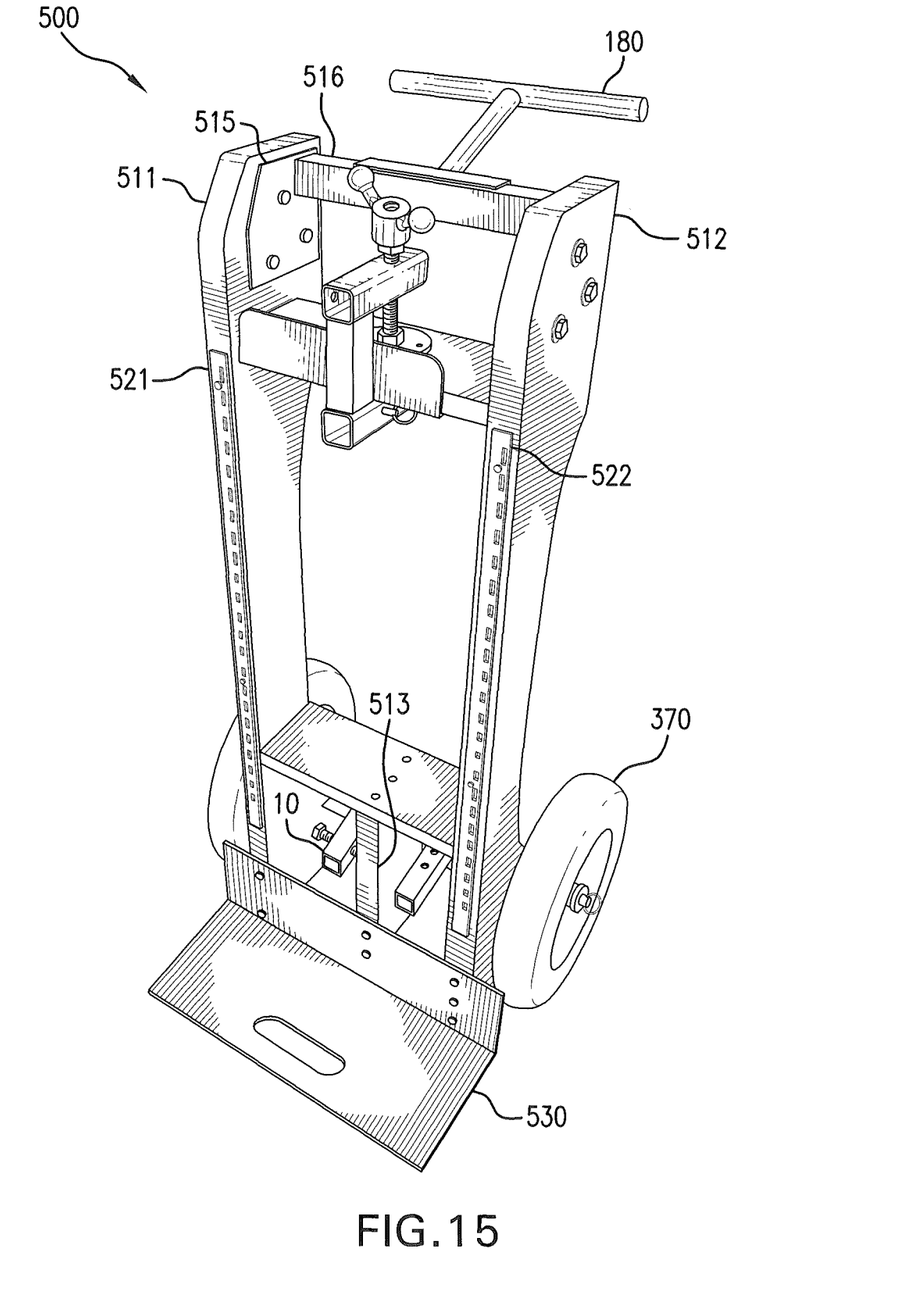
FIG. 15 is a schematic diagram of an embodiment of a hand truck.

Also disclosed is a hand truck 500 as shown in FIG. 15. The hand truck 500 comprises a frame including a first side member 511 and a second side member 512. A top handle mount 515 is interposed between the first side member 511 and the second side member 512.

A handle may be removably mounted on a crossbar member 516 of the top handle mount. The handle may be the single handle 170, the T-handle 180, the double handle 190, or the cart handle 200. The handle may be removably disposed using a quick-release pin 150, as further disclosed above, or disposed using a bolt, for example.

The hand truck may further comprise first shelf mount 521 on a front side of the first side member 511; and a second shelf mount 522 on a front side of the second side member 512. The first and shelf mounts 521 and 522, respectively, may be configured to engage a shelf bracket, not shown. The hand truck 500 may further comprise a hand truck lip 530 on the front side of the first side member 511 and the front side of the second side member 512.

The hand truck further comprises a wheel clamp assembly 300 clamped to a middle member 513 of the frame. In an embodiment, the wheel clamp assembly 300 includes a clamp assembly 10 on the middle member 513, the clamp assembly including a clamp frame including a first portion 101 including a first opening 111 which accepts a fastener, and a second portion 102 interposed between the first portion 101 and a third portion 103, wherein the third portion 103 includes a second opening 112 and a third opening 113, each of which accepts a fastener. The fastener may be a quick-release pin 150, or a bolt, for example. The clamp assembly 10 further comprises a threaded rod 120 disposed through the first portion 101 of the clamp frame, and a clamp pad 130 on an inner end of the clamp rod. A wheel mount 350 may be on the second portion 102 of the clamp frame, the wheel mount having a first end and a second end, and a wheel 370 on each of the first end and the second end of the wheel mount.

Figures 16, 17:
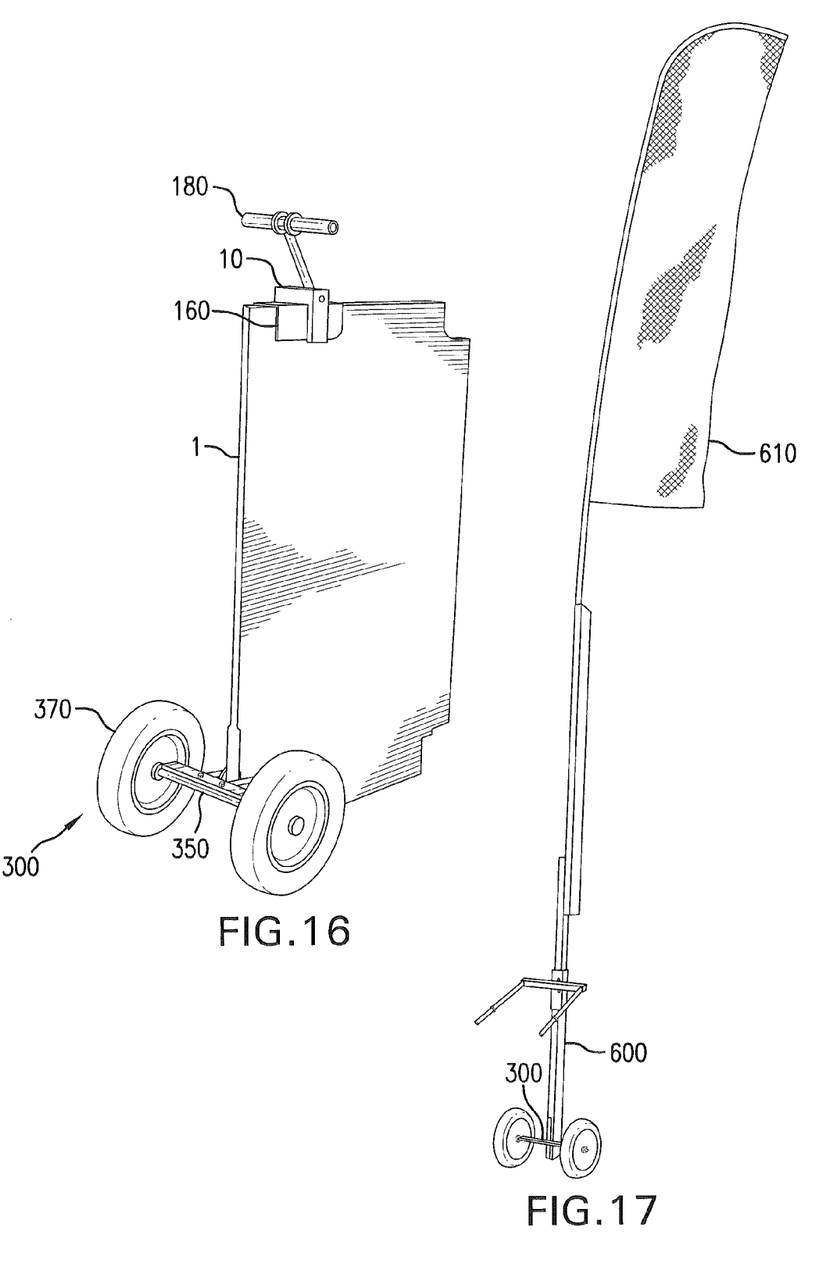
FIG. 16 a schematic diagram of an embodiment of a method of moving sheet media.
FIG. 17 is a schematic diagram of an embodiment of a mobile advertiser.

Also disclosed is a method of moving sheet media 1, such as a pool table slate, sheet rock, or plywood, as shown in FIG. 16. The method includes mounting a handle clamp assembly on the sheet media, the handle clamp assembly comprising a clamp assembly 10 and a handle, such as the single handle 170, the T-handle 180, the double handle 190, or the cart handle 200. The method may further comprise mounting a wheel clamp assembly 300 on the sheet media, the wheel clamp assembly comprising a clamp assembly 10, a wheel mount 350, and a wheel 370. The handle clamp assembly or the wheel clamp assembly may be suitably located on the sheet media to balance the load.

Also disclosed are mobile advertiser and a method of advertising, as shown in FIG. 17. The method includes clamping a wheel clamp assembly 300 to a post 600, and mounting a banner 610 on the post 600. A clamp assembly 10 and a handle disposed thereon, such as a double handle 190, may be further optionally mounted on the post 600. A tool tree mount 420 may be further optionally mounted on the post 600 to provide stability to the apparatus. The post may be a wood 2×4 or 2×6, for example.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A clamp assembly comprising:
a clamp frame including a first portion and a second portion interposed between the first portion and a third portion;
a threaded rod disposed through the first portion of the clamp frame;
a clamp pad on an inner end of the threaded rod; and
a panel which is disposed opposite the clamp pad and on a surface of the third portion,
wherein the clamp pad is removably disposed on the threaded rod and includes a safety hole through the clamp pad which is effective for fastening an article to the clamp pad, and
wherein the safety hole is disposed in a direction substantially parallel to a direction of the threaded rod.

2. The clamp assembly of claim 1, further comprising a washer and a nut on the threaded rod, wherein the washer is disposed between the clamp pad and the nut.

3. The clamp assembly of claim 2, wherein the nut comprises a set-screw.

4. The clamp assembly of claim 1, wherein the clamp pad contacts a nut which is disposed on the threaded rod.

5. The clamp assembly of claim 1, wherein the clamp pad has an outer surface adjacent the threaded rod and an opposite inner surface, and wherein the outer surface and the inner surface are substantially parallel.

6. The clamp assembly of claim 1, wherein the panel further comprises a tab which comprises a surface which is perpendicular to a surface of the panel.

7. The clamp assembly of claim 6, wherein the tab contacts the third portion.

8. The clamp assembly of claim 1, wherein the panel is slidably disposed on the third portion.

9. The clamp assembly of claim 1, wherein the panel is removably disposed on the third portion.

10. The clamp assembly of claim 1, further comprising a T-spinner handle removably disposed on an outer end of the threaded rod, wherein the outer end is opposite the inner end.

11. The clamp assembly of claim 10, wherein the T-spinner handle is threadedly disposed on the threaded rod.

12. The clamp assembly of claim 1, wherein at least one of the first portion and the third portion has a rectilinear cross-section.

13. The clamp assembly of claim 1, wherein at least one of the first portion and the third portion is tubular.

14. The clamp assembly of claim 1, further comprising a wheel mount disposed on the second portion of the clamp frame, the wheel mount having a first end and a second end,
 a wheel on each of the first end and the second end of the wheel mount,
 a post having a first end and a second end, the first end interposed between the clamp pad and the panel, and
 a banner, the banner extending from the post.

15. The clamp assembly of claim 14, further comprising a handle on the post.

16. A clamp assembly comprising:
 a clamp frame including a first portion and a second portion interposed between the first portion and a third portion, the clamp frame having at least one opening therein;
 a threaded rod disposed through the first portion of the clamp frame;
 a clamp pad on an inner end of the threaded rod, wherein the clamp pad includes a safety hole through the clamp pad which is effective for fastening an article to the clamp pad, and wherein the safety hole is disposed in a direction substantially parallel to a direction of the threaded rod;
 a fastener engageable with the at least one opening in the clamp frame; and
 a member operatively arranged for facilitating transport of an article clamped by the clamp assembly, wherein the member is removably attached to the clamp frame via engagement of the fastener with the at least one opening.

17. The clamp assembly of claim 16, wherein the clamp pad is removably disposed on the threaded rod.

18. The clamp assembly of claim 16, wherein the clamp pad has an outer surface adjacent the threaded rod and an opposite inner surface, and wherein the outer surface and the inner surface are substantially parallel.

19. The clamp assembly of claim 16, further comprising a panel which is disposed opposite the clamp pad and on a surface of the third portion, wherein the panel further comprises a tab which comprises a surface which is perpendicular to a surface of the panel and wherein the panel is removably disposed on the third portion.

20. The clamp assembly of claim 19, wherein the panel is slidably disposed on the third portion.

21. The clamp assembly of claim 16, wherein the member is a handle, a set of wheels, or a slate shoe.

22. The clamp assembly of claim 16, further comprising a vertical member of a tool tree clamped by the clamp pad.

23. A kit comprising:
 a clamp assembly including:
  a clamp frame including a first portion and a second portion interposed between the first portion and a third portion, the clamp frame having at least one opening therein,
  a threaded rod disposed through the first portion of the clamp frame, and
  a clamp pad on an inner end of the threaded rod and facing the third portion, wherein the clamp pad comprises a safety hole which is disposed in a direction substantially parallel to a direction of the threaded rod;
 at least one fastener receivable in the at least one opening; and
 a plurality of members operatively arrangeable for facilitating transport of an article clamped by the clamp assembly, each of the members removably attachable to the clamp frame via engagement of the at least one fastener with the at least one opening, the plurality of members including at least one of a handle, a set of wheels, or a slate shoe.

24. The kit of claim 23 comprising a plurality of the clamp assemblies.

25. The kit of claim 23 further comprising a vertical member of a tool tree clamped by the clamp pad.

* * * * *